United States Patent
Chuang

(10) Patent No.: US 8,899,495 B2
(45) Date of Patent: Dec. 2, 2014

(54) MIST GENERATING SYSTEM

(76) Inventor: Meng-Yao Chuang, Taichung (TW)

(*) Notice: Subject to any disclaimer, the term of this patent is extended or adjusted under 35 U.S.C. 154(b) by 393 days.

(21) Appl. No.: 13/543,898

(22) Filed: Jul. 9, 2012

(65) Prior Publication Data

US 2014/0008458 A1     Jan. 9, 2014

(51) Int. Cl.
    *B05B 1/24*      (2006.01)
(52) U.S. Cl.
    USPC ......... 239/128; 239/14.1; 239/77; 239/132.1; 239/132.5; 239/214; 239/222.11; 239/289; 239/575; 239/585.1; 62/304; 62/312; 261/78.1; 261/89; 261/DIG. 3
(58) Field of Classification Search
    USPC ............... 239/14.1, 128, 132.1, 132.3, 132.5, 239/214, 222.11, 77, 289, 332, 575, 585.1; 62/304, 311, 312; 261/28, 78.1, 78.2, 261/89, DIG. 3
See application file for complete search history.

(56) References Cited

U.S. PATENT DOCUMENTS

| | | | | |
|---|---|---|---|---|
| 5,000,384 A | * | 3/1991 | Arnold | 239/128 |
| 5,979,793 A | * | 11/1999 | Louis | 239/128 |
| 6,158,669 A | * | 12/2000 | Louis | 239/289 |
| 8,006,916 B2 | * | 8/2011 | Metcalf et al. | 261/78.2 |
| 2009/0143004 A1 | * | 6/2009 | Tam et al. | 239/289 |

* cited by examiner

*Primary Examiner* — Steven J Ganey

(57) ABSTRACT

A mist generating system includes an input pipeline, an iced water tank, a heat exchanger, a nebulizing pump, an output pipeline, a pressure regulating set and a pressure releasing set communicating with each other via a plurality of pipes. The iced water tank is connected between the input pipeline and the nebulizing pump. The iced water tank is connected to the heat exchanger. One end of the output pipeline is connected to the nebulizing pump. Another end of the output pipeline is connected to the pressure regulating set. The pressure regulating set is connected to the iced water tank. One end of the pressure releasing set connected between the nebulizing pump and the output pipeline. Another end of the pressure releasing set connected to the iced water tank. When the mist generating system is turned on, a volume of water is ejected toward the outside in a mist form.

5 Claims, 3 Drawing Sheets

MIST GENERATING SYSTEM

BACKGROUND OF THE INVENTION

1. Field of the Invention

The present invention relates to a system, and more particularly to a mist generating system.

2. Description of Related Art

Recently, due to the greenhouse effect, the global temperature increases higher and higher. Suffering the extraordinarily hot weather is quite common in summer, as it ought to be, thus people try to cool down themselves and the place they lived in by different kinds of appliances, such as electric fan and air-conditioner.

A conventional mist generating system comprises a heat exchanger assembly, a pressurizing assembly and a moist releasing assembly. The said assemblies communicate with each other via a plurality of pipelines. A volume of water flows in the pipelines. Under this arrangement, the water flows to the heat exchanger and the heat exchanger assembly cools down the temperature of the water and delivers the water to the pressurizing assembly; then, the pressurizing assembly pressurizes the water and delivers the water back to the heat exchanger assembly to cool down the temperature of the water again; thereafter, the heat exchanger assembly delivers the water which is pressurized and twice cooled to the moist releasing assembly; finally, the moist releasing assembly transforms the water into a volume of mist and releases the mist to the outside. Therefore, the outside temperature is cooled down by the mist from the conventional mist generating system, and a degree of the moistness is regulated by the conventional mist generating system. Furthermore, the conventional cooling system further comprises a water flow recycling assembly and a water filtering assembly. One end of the water flow recycling assembly communicates with one pipeline which is connected between the heat exchanger assembly and the moist releasing assembly Another end of the water flow recycling assembly communicates with another pipeline which is connected between the water filtering assembly and the heat exchanger. The water flow recycling assembly is used to deliver the water which is not timely transformed into the mist by the moist releasing assembly back to the heat exchanger assembly.

However, the conventional cooling system has some disadvantages as following.

Firstly, when the conventional mist generating system is turned off, the pressure of the cooled water that is pressurized by the pressurizing assembly cannot be reduced, so that the cooled water which is not ejected out yet would drop down from the moist releasing assembly. Therefore, the conventional mist generating system causes a waste of the water.

Secondly, the pressure of the cooled water in the pipelines is not a constant so that some issues would be caused. For example, when the pressure of the water in the pipelines is too small, the cooled water cannot be ejected from the conventional mist generating system; conversely, when the pressure of the water in the pipelines is too large, the pipelines would be broken by the pressure of the water in the pipelines.

The present invention has arisen to mitigate and/or obviate the disadvantages of the conventional.

SUMMARY OF THE INVENTION

The main objective of the present invention is to provide mist generating system.

To achieve the objective, mist generating system comprises an input pipeline, an iced water tank, a heat exchanger, a nebulizing pump, an output pipeline, a pressure regulating set and a pressure releasing set, the input pipeline, the iced water tank, the heat exchanger, the nebulizing pump, the output pipeline, the pressure regulating set and the pressure releasing set communicating with each other via a plurality of pipes, the iced water tank connected between the input pipeline and the nebulizing pump via the pipes, the iced water tank connected to the heat exchanger via the pipes, one end of the output pipeline connected to the nebulizing pump, another end of the output pipeline connected to one end of the pressure regulating set via the pipes, another end of the pressure regulating set connected to the iced water tank via the pipes, one end of the pressure releasing set connected between the nebulizing pump and the output pipeline via the pipes, another end of the pressure releasing set connected to the iced water tank, the pressure regulating set having a regulating valve and a pressure gauge, the pressure gauge connected to the regulating valve in series, the pressure releasing set having a releasing valve and an electromagnetic valve, the electromagnetic valve connected to the releasing valve in parallel. Wherein the input pipeline has a water filter; the iced water tank has a drain valve; the output pipeline has a plurality of fan nozzles and a plurality of hoses; the hoses is connected to the fan nozzles; the pipes are made of galvanized iron.

Under this arrangement, when the power of the present invention is turned on, a volume of water flows into the iced water tank via the input pipeline and is cooled by the heat exchanger; thereafter, the cooled water is pressurized by the nebulizing pump so that the cooled water is ejected out from the present invention via the output pipeline; finally, the cooled water being ejected out is formed as a mist because of the pressurization of the nebulizing pump; in addition, the cooled water which is not ejected out yet flows back to the iced water tank via the regulating valve; in contrast, when the power of the present invention is turned off, the electromagnetic valve opens so that the cooled water which is pressurized by the nebulizing pump flows back toward the iced water tank via the electromagnetic valve.

Further benefits and advantages of the present invention will become apparent after a careful reading of the detailed description with appropriate reference to the accompanying drawings.

DETAILED DESCRIPTION OF THE INVENTION

Figure 1:
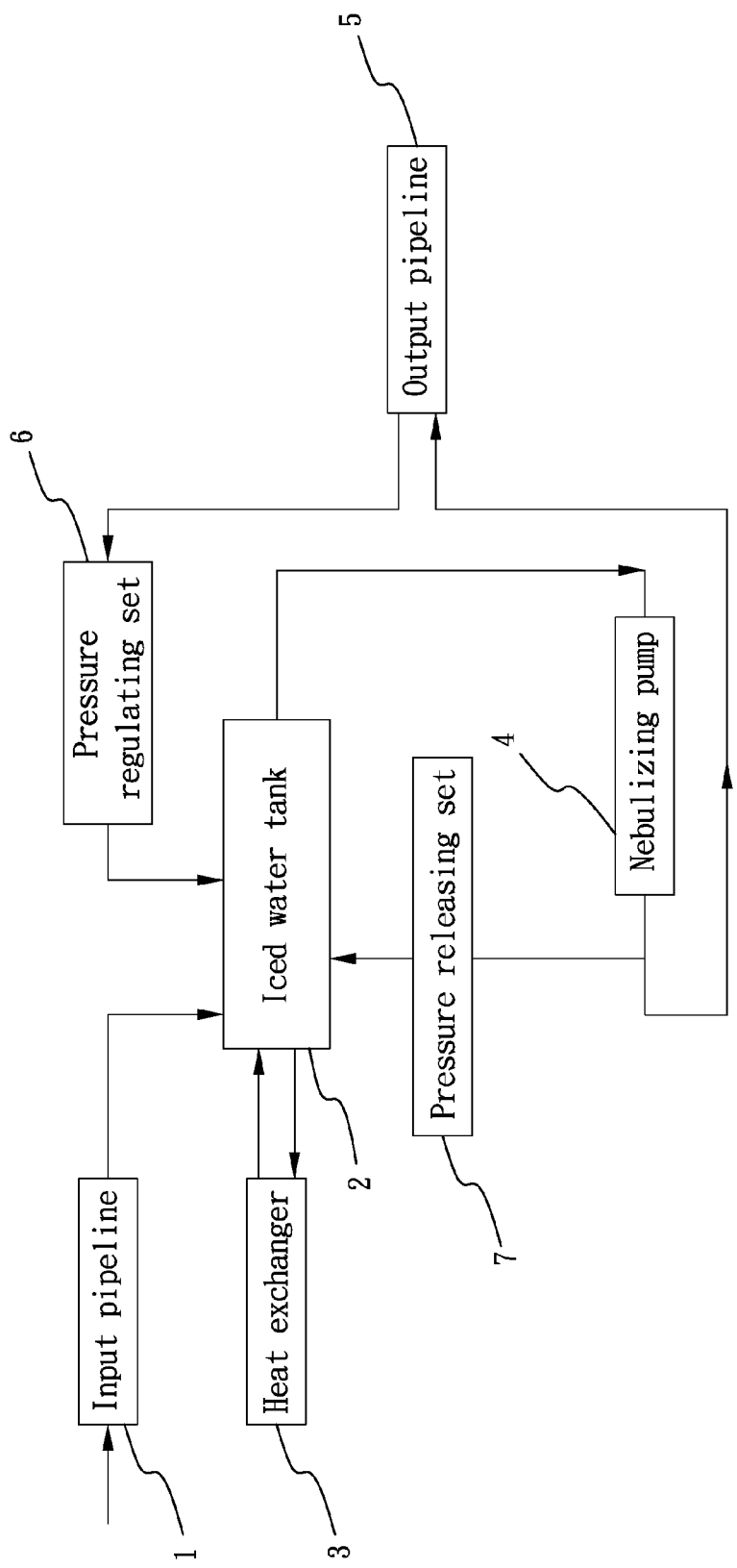
FIG. 1 is a block chart for showing a connection between an input pipeline, an iced water tank, a heat exchanger, a nebulizing pump, an output pipeline, a pressure regulating set, a pressure releasing set and a plurality of pipes of the present invention.
Figure 3:
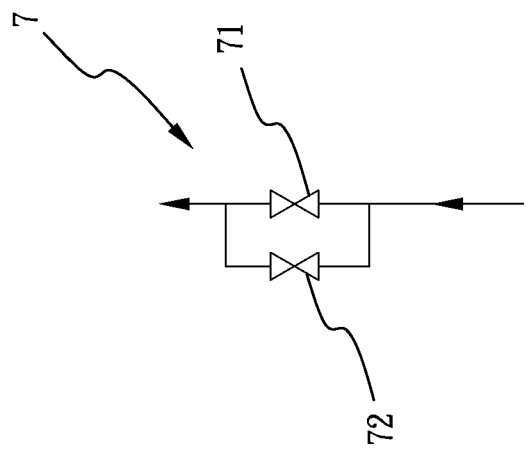
FIG. 3 is a block chart for showing an inner layout of the pressure releasing set.
Figure 2:
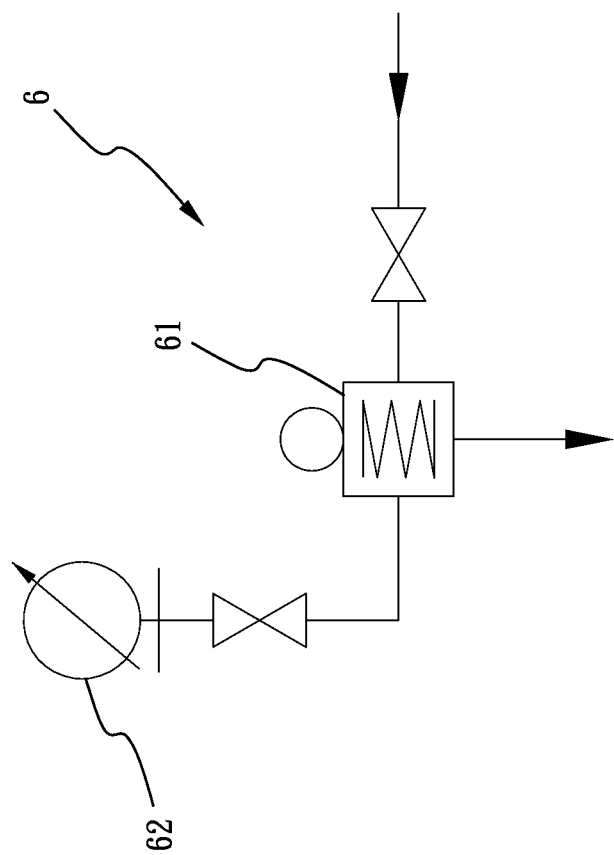
FIG. 2 is a block chart for showing an inner layout of the pressure regulating set.

Referring to the drawings and initially to FIGS. 1-3, a mist generating system in accordance with the present invention comprises an input pipeline 1, an iced water tank 2, a heat exchanger 3, a nebulizing pump 4, an output pipeline 5, a pressure regulating set 6 and a pressure releasing set 7. The input pipeline 1, the iced water tank 2, the heat exchanger 3, the nebulizing pump 4, the output pipeline 5, the pressure regulating set 6 and the pressure releasing set 7 communicate with each other via a plurality of pipes.

The iced water tank 2 is connected between the input pipeline 1 and the nebulizing pump 4 via the pipes. The iced water tank 2 is also connected to the heat exchanger 3 via the pipes. One end of the output pipeline 5 is connected to the nebulizing pump 4, and another end of the output pipeline 5 is connected to one end of the pressure regulating set 6 via the pipes. Another end of the pressure regulating set 6 is connected to the iced water tank 2 via the pipes. One end of the pressure releasing set 7 is connected between the nebulizing pump 4 and the output pipeline 5 via the pipes. Another end of the pressure releasing set 7 is connected to the iced water tank 2.

The pressure regulating set 6 has a regulating valve 61 and a pressure gauge 62. The pressure gauge 62 connects to the regulating valve 61 in series.

The pressure releasing set 7 has a releasing valve 71 and an electromagnetic valve 72. The electromagnetic valve 72 is connected to the releasing valve 71 in parallel.

Under this arrangement, a user operates the present invention via the following steps.

Firstly, the power of the present invention is turned on; then, a volume of water flows into the iced water tank 2 via the input pipeline 1 and is cooled by the heat exchanger 3; thereafter, the cooled water is pressurized by the nebulizing pump 4 so that the cooled water is ejected out from the present invention via the output pipeline 5; finally, the cooled water being ejected out is formed as a mist because of the pressurization of the nebulizing pump 4. In addition, the cooled water which is not ejected out yet flows back to the iced water tank 2 via the regulating valve 61.

Secondly, as the pressure of the cooled water which is pressurized by the nebulizing pump 4 is higher than a certain pressure, the releasing valve 71 of the pressure releasing set 7 opens so that the cooled water which is pressurized by the nebulizing pump 4 flows back toward the iced water tank 2. Therefore, the pressure of the cooled water which is pressurized by the nebulizing pump 4 is reduced. In this embodiment, the certain pressure is set as 80 kilograms per centimeter square.

Thirdly, the regulating valve 61 of the pressure regulating set 6 regulates the pressure of the cooled water which flows from the output pipeline 5 so as to make the pressure of the cooled water which flows back to the iced water tank 2 be the same as the pressure of the cooled water which flows from the nebulizing pump 4 and flows toward the output pipeline 5. Further, the pressure regulating set 6 restraints the flow rate of the cooled water via the regulating valve 61, and inspects the pressure of the cooled water which flows toward the iced water tank 2 via the pressure gauge 62.

Finally, when the power of the present invention is turned off, the electromagnetic valve 72 opens so that the cooled water which is pressurized by the nebulizing pump 4 flows back toward the iced water tank 2 via the electromagnetic valve 72.

Therefore, the pressure of the cooled water of the pipes would be a constant because of the pressure regulating set 6 and the pressure releasing set 7. Additionally, when the power of the present invention is turned off, the pressure of the cooled water which is pressurized by the nebulizing pump 4 in the pipes can be reduced so that the present invention avoids the cooled water which is not ejected out yet from dropping down from the output pipeline 5.

Furthermore, before the water flows into the iced water tank 2, the temperature of the water is 25 Celsius degree. When the water flows into the iced water tank 2 and is cooled by the heat exchanger 3, the temperature of the water source is 1.5 Celsius degree. After the cooled water is pressurized by the nebulizing pump 4 and flows to the output pipeline 5, the temperature of the cooled water arises to 10 Celsius degree.

Figure 4:
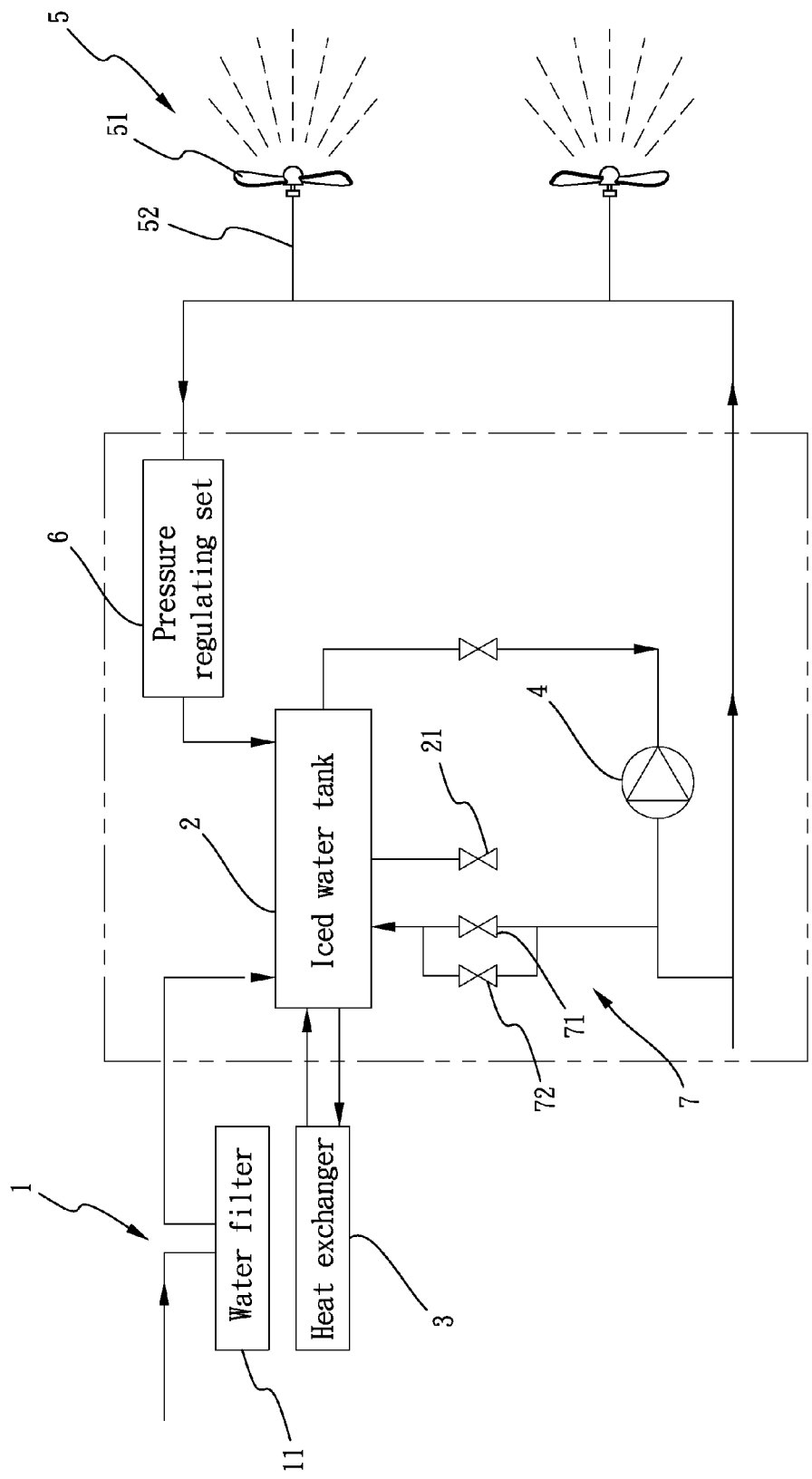
FIG. 4 is a block chart for showing the second embodiment of the present invention.

Referring to the FIG. 4, the second embodiment is shown as following. The input pipeline 1 has a water filter 11. Before the water flows into the iced water tank 2, the water is filtered by the water filter 11 to remove the impurities of the water. The output pipeline 5 has a plurality of fan nozzles 51 and a plurality of hoses 52. The hoses 52 is connected to the fan nozzles 51. Under this arrangement, after the cooled water which is ejected out from the present invention, the fan nozzles 51 fans the cooled water so that the cooled water uniformly flows in the outside air. The iced water tank 2 has a drain valve 21 to exhaust the cooled water in the ice water tank 2 for maintaining the ice water tank 2. The pipes are made of galvanized iron.

Although the invention has been explained in relation to its preferred embodiment, it is to be understood that many other possible modifications and variations can be made without departing from the spirit and scope of the invention as hereinafter claimed.

What is claimed is:

1. A mist generating system comprising:
   an input pipeline, an iced water tank, a heat exchanger, a nebulizing pump, an output pipeline, a pressure regulating set and a pressure releasing set;
   the input pipeline, the iced water tank, the heat exchanger, the nebulizing pump, the output pipeline, the pressure regulating set and the pressure releasing set communicating with each other via a plurality of pipes;
   the iced water tank connected between the input pipeline and the nebulizing pump via the pipes, the iced water tank connected to the heat exchanger via the pipes, one end of the output pipeline connected to the nebulizing pump, another end of the output pipeline connected to one end of the pressure regulating set via the pipes, another end of the pressure regulating set connected to the iced water tank via the pipes, one end of the pressure releasing set connected between the nebulizing pump and the output pipeline via the pipes, another end of the pressure releasing set connected to the iced water tank;
   the pressure regulating set having a regulating valve and a pressure gauge, the pressure gauge connected to the regulating valve in series; and
   the pressure releasing set having a releasing valve and an electromagnetic valve, the electromagnetic valve connected to the releasing valve in parallel;
   wherein when power is turned on, a volume of water flows into the iced water tank via the input pipeline and is cooled by the heat exchanger; thereafter, the cooled water is pressurized by the nebulizing pump so that the cooled water is ejected out via the output pipeline; finally, the cooled water being ejected out is formed as a mist because of the pressurization of the nebulizing pump; in addition, the cooled water which is not ejected out yet flows back to the iced water tank via the regulating valve; in contrast, when the power is turned off, the electromagnetic valve opens so that the cooled water which is pressurized by the nebulizing pump flows back toward the iced water tank via the electromagnetic valve.

2. The mist generating system as claimed in claim 1, wherein the input pipeline has a water filter.

3. The mist generating system as claimed in claim 1, wherein the iced water tank has a drain valve.

4. The mist generating system as claimed in claim 1, wherein the output pipeline has a plurality of fan nozzles and a plurality of hoses; the plurality of hoses are connected to the fan nozzles.

5. The mist generating system as claimed in claim 1, wherein the pipes are made of galvanized iron.

\* \* \* \* \*